United States Patent
Kim et al.

(10) Patent No.: US 8,601,945 B2
(45) Date of Patent: Dec. 10, 2013

(54) PRINTING DEVICE, PATTERNING METHOD USING THE SAME, AND METHOD OF FABRICATING A LIQUID CRYSTAL DISPLAY DEVICE USING THE SAME

(75) Inventors: Chul Ho Kim, Paju-si (KR); Tae Young Oh, Paju-si (KR); Choon Ho Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 299 days.

(21) Appl. No.: 12/659,074

(22) Filed: Feb. 24, 2010

(65) Prior Publication Data

US 2010/0159788 A1     Jun. 24, 2010

Related U.S. Application Data

(62) Division of application No. 11/819,724, filed on Jun. 28, 2007, now Pat. No. 7,765,929.

(30) Foreign Application Priority Data

Jun. 30, 2006   (KR) .................. 10-2006-0060431

(51) Int. Cl.
*B41L 33/00*     (2006.01)

(52) U.S. Cl.
USPC ......................................... 101/423; 101/483

(58) Field of Classification Search
CPC ...... B41F 35/00; B41F 35/04; B41P 2235/27; G02F 1/1303
USPC ................. 101/423, 483, 424, 424.1; 34/122
IPC ....................................................... B41L 33/00
See application file for complete search history.

(56) References Cited

U.S. PATENT DOCUMENTS

| | | | |
|---|---|---|---|
| 2,676,536 A * | 4/1954 | Ste-Marie | 101/141 |
| 4,841,903 A | 6/1989 | Bird | |
| 5,454,310 A | 10/1995 | Hayes | |
| 6,237,484 B1 | 5/2001 | Homma et al. | |
| 6,418,844 B1 | 7/2002 | Franklin et al. | |
| 6,485,127 B2 | 11/2002 | Ohsawa et al. | |
| 6,759,348 B1 | 7/2004 | Cho | |
| 6,928,930 B1 * | 8/2005 | Gottling et al. | 101/424 |
| 6,936,105 B2 * | 8/2005 | De Vroome | 118/264 |
| 7,406,915 B2 | 8/2008 | Yoo | |
| 7,428,868 B2 | 9/2008 | Petri | |
| 7,430,962 B2 | 10/2008 | Kim et al. | |
| 2003/0081095 A1 * | 5/2003 | Yi et al. | 347/101 |
| 2005/0243262 A1 * | 11/2005 | Kim et al. | 349/156 |

FOREIGN PATENT DOCUMENTS

| | | | |
|---|---|---|---|
| CN | 1437044 | | 8/2003 |
| CN | 1468729 | | 1/2004 |
| JP | 11198337 | A * | 7/1999 |
| JP | 2000-135852 | | 5/2000 |
| JP | 2000135852 | A * | 5/2000 |
| KR | 10-2003-0096012 A | | 12/2003 |

* cited by examiner

*Primary Examiner* — Judy Nguyen
*Assistant Examiner* — Jennifer Simmons
(74) *Attorney, Agent, or Firm* — McKenna Long & Aldridge LLP

(57) ABSTRACT

A printing device, a patterning method using the same and a method of fabricating an LCD device using the same are disclosed. The printing device includes a printing roll having a blanket adhered to an outer surface thereof; and an absorption nozzle to absorb solvent from the blanket. The absorption nozzle may include an absorber having a slit, a vacuum controller connected to the absorber, and a pipe connected to the vacuum controller.

11 Claims, 9 Drawing Sheets

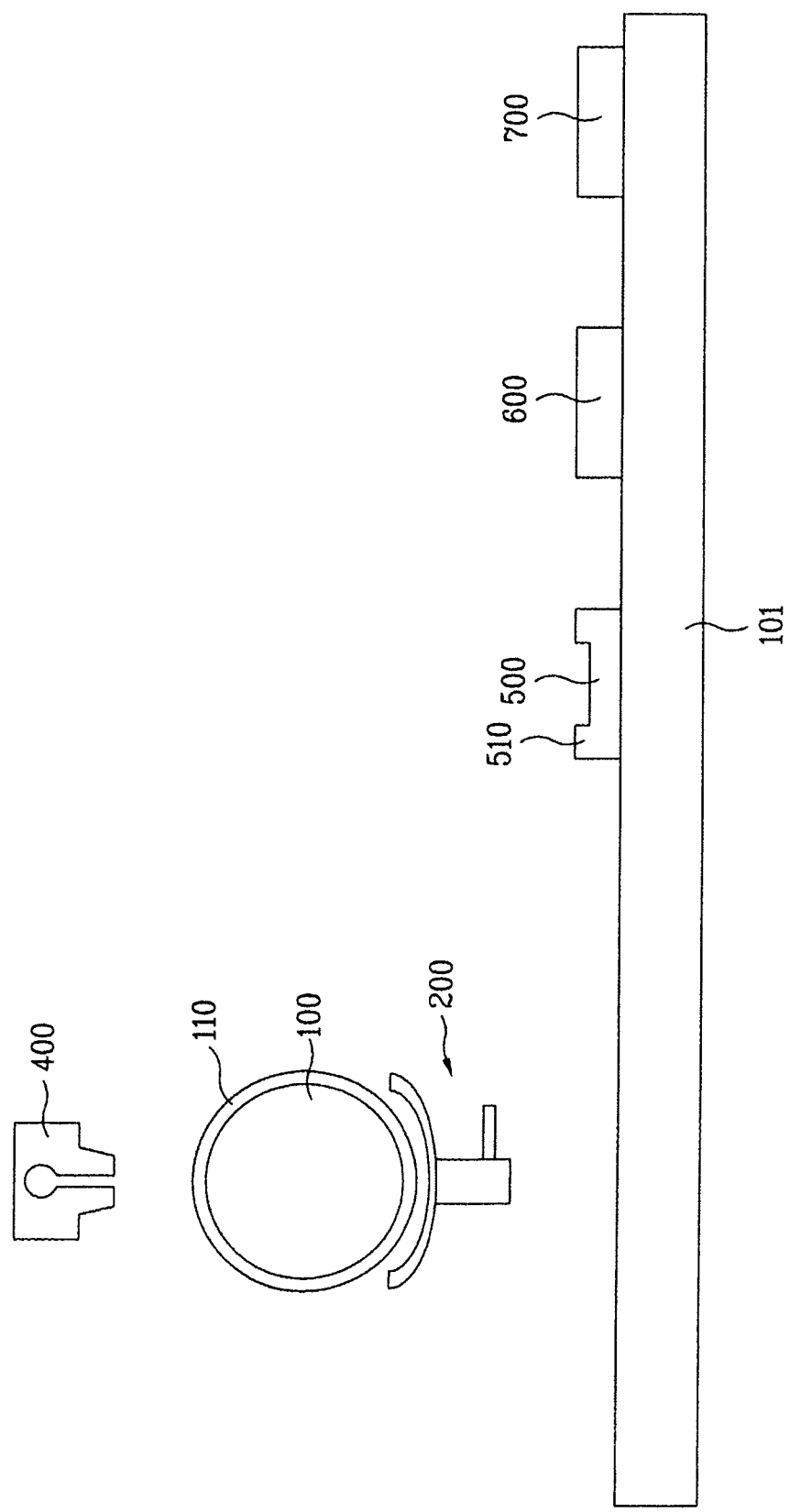

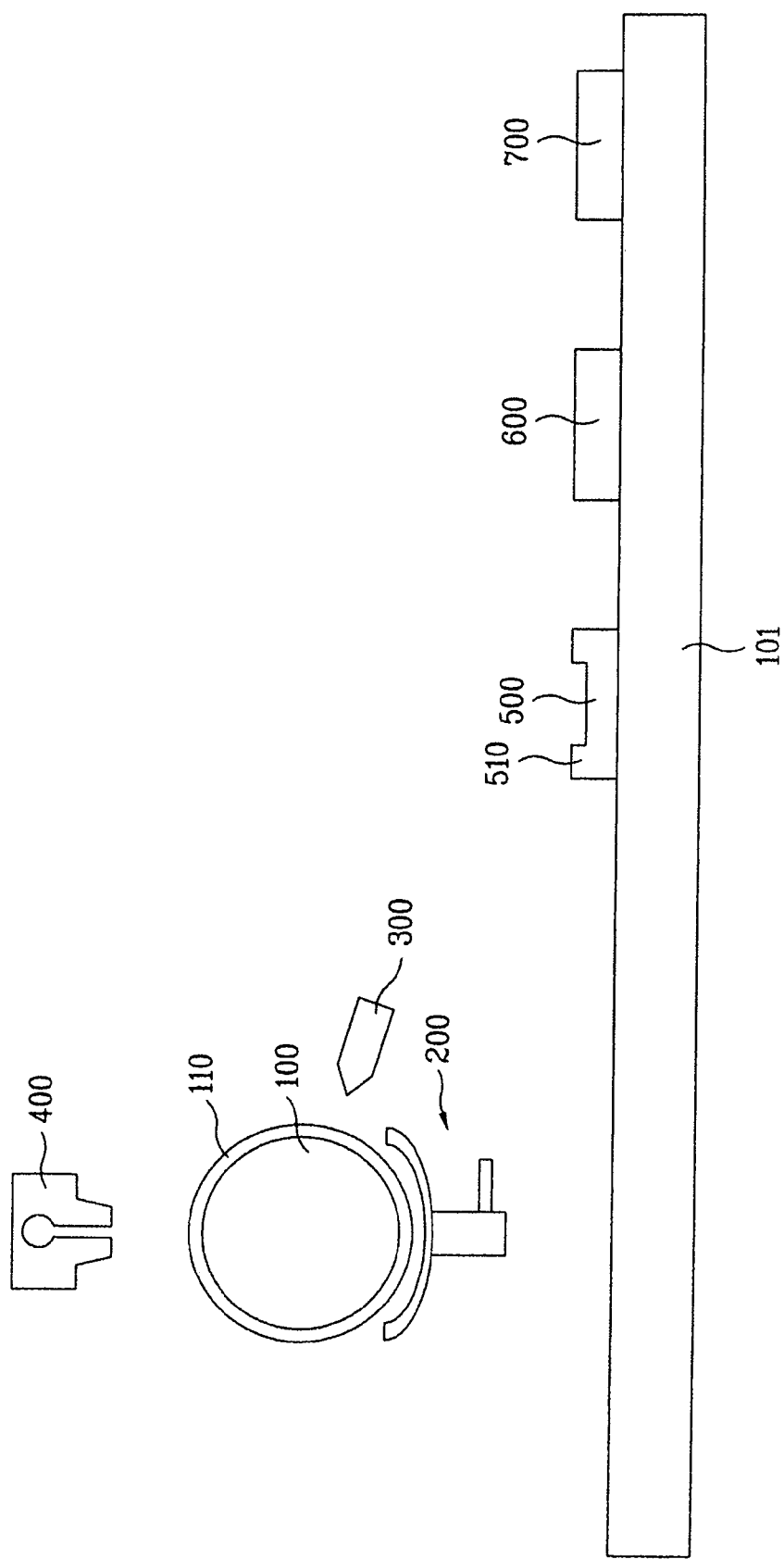

PRINTING DEVICE, PATTERNING METHOD USING THE SAME, AND METHOD OF FABRICATING A LIQUID CRYSTAL DISPLAY DEVICE USING THE SAME

This application is a Divisional of application Ser. No. 11/819,724 filed Jun. 28, 2007, now U.S. Pat. No. 7,765,929; which claims priority to Korean Patent Application No. 10-2006-0060431, filed Jun. 30, 2006 all of which are hereby incorporated by reference for all purposes as if fully set forth herein.

BACKGROUND OF THE INVENTION

1. Field of the Invention

The present invention relates to a liquid crystal display (LCD) device, and a method of forming a pattern of LCD device by printing.

2. Discussion of the Related Art

Typically, a liquid crystal display (LCD) device includes lower and upper substrates and a liquid crystal layer formed between the lower and upper substrates. The lower substrate typically includes a thin film transistor and a pixel electrode and the upper substrate may include a light-shielding layer, a color filter layer and a common electrode.

An LCD device is provided with various components patterned by repeated processes. Photolithography is used to pattern the plurality of components in the various shapes used in the LCD device. Photolithography uses a mask having a predetermined pattern and a light-irradiation device resulting in an increase in the cost of manufacturing LCD devices. In addition, photolithography includes exposure and development processes that complicate the manufacturing process and increase manufacturing time.

To overcome the problems associated with photolithography, new patterning methods, such as a printing method, have been developed.

In the printing method, a predetermined material is coated on a printing roll, and the printing roll coated with the predetermined material is then rolled on a substrate to transcribe predetermined pattern onto the substrate. Hereinafter, a related art printing method will be described with reference to the accompanying drawings.

FIGS. 1A to 1C schematically illustrate a related art printing method.

First, as shown in FIG. 1A, a pattern material 20 is applied to a printing roll 30 through a printing nozzle 10. A blanket 35 adheres to the outer surface of printing roll 30 and is coated with the applied pattern material 20. The blanket 35 should have properties of good adherence to the printing roll 30 and high resistance to deformation during the printing process. The blanket 35 is typically formed of a Si-based resin.

After coating the pattern material onto the printing roll, as shown in FIG. 1B, the printing roll 30 is rolled onto a printing plate 40 having a plurality of protruding patterns 46 and groove patterns 43. As a result, some 20a of the pattern material is transcribed or transferred onto the protruding patterns 46 of printing plate 40, leaving remaining pattern material 20b to form a predetermined pattern on the blanket 35 of the printing roll 30.

Referring to FIG. 1C, the printing roll 30 is rotated on a substrate 50 and the remaining pattern material 20b on printing roll 30 is transcribed on the substrate 50, thereby forming the desired pattern on the substrate 50.

Using the above described printing method allows omitting the exposure and development processes used in photolithography. Accordingly, the printing method has lower fabrication cost and uses simpler processes than do processes using photolithography, making the printing method suitable for use in the mass-production.

As the pattern formation of printing method is performed repeatedly, a solvent of pattern material 20 is absorbed into the blanket 35 adhering to the outer surface of printing roll 30. As a result of absorbing the solvent, the blanket 35 may swell deforming the shape of the blanket 35. The deformation of the blanket 35 may interfere with forming a precise pattern.

For example, as shown in FIG. 2A, if during the process of rolling the blanket 35 of printing roll 30 coated with the pattern material 20 on the printing plate 40 provided with the protruding patterns 46 and groove patterns 43, the blanket 35 has a swollen portion, the pattern material 20 may contact the printing plate 40 within the groove patterns 43 of the printing plate 40. As a result of the contact within the groove patterns 43 of the printing plate 40, as shown in FIG. 2B, some of the pattern material 20b is transferred onto the groove patterns 43 in addition to the pattern material 20a that is transcribed on the protruding patterns. Accordingly, pattern material 20c remaining on the blanket 35 of printing roll 30 does not include the pattern material formed in region "A" and the desired precise pattern on the printing roll 30 is not formed.

SUMMARY OF THE INVENTION

Accordingly, the present invention is directed to a printing device, a patterning method using the same, and a method of fabricating a liquid crystal display (LCD) device using the same that substantially obviates one or more of the problems due to limitations and disadvantages of the related art.

An advantage of the present invention is to provide a printing device to prevent a blanket adhered to a printing roll from being swollen by a solvent included with a pattern material.

Another advantage of the present invention is to provide a patterning method to prevent a blanket adhered to a printing roll from being swollen by a solvent included with a pattern material.

Another advantage of the present invention is to provide a method of fabricating an LCD device using the patterning method to eliminate or reduce the forming of defective pattern in the LCD device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a printing device includes a printing roll having a blanket adhered to an outer surface thereof and an absorption nozzle to absorb solvent from the blanket.

In another aspect of the present invention, a patterning method includes: coating a blanket adhered to an outer surface of a printing roll with a pattern material; absorbing a solvent from the blanket of the printing roll; rolling the printing roll on a printing plate to transfer some of the pattern material onto protrusions of the printing plate leaving a remaining pattern material on the printing roll to form a predetermined pattern on the printing roll; and rolling the printing roll on a substrate to transfer the predetermined pattern onto the substrate.

In another aspect of the present invention, a method of fabricating an LCD device includes: preparing first and second substrates; and forming a liquid crystal layer between the first and second substrates, wherein preparing the first substrate includes forming a pattern on the first substrate using a patterning method comprising: coating a blanket adhered to outer surface of a printing roll with a pattern material; absorbing a solvent from the blanket of printing roll; rolling the printing roll on a printing plate to transcribe some of the pattern material on protrusions of the printing plate and to leave remaining pattern material on the blanket to form a predetermined pattern on the printing roll; and rolling the printing roll on a substrate to transfer the predetermined pattern onto a substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a cross section view schematically illustrating a printing device according to an embodiment of the present invention;

FIG. 5 is a schematic view illustrating a printing device according to another embodiment of the present invention.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a printing device according to the present invention will be described with reference to the accompanying drawings.

Figure 1A:
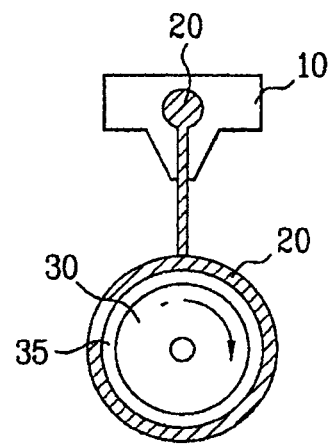
FIGS. 1A to 1C are cross section views schematically illustrating a related art printing method.
Figure 1B:
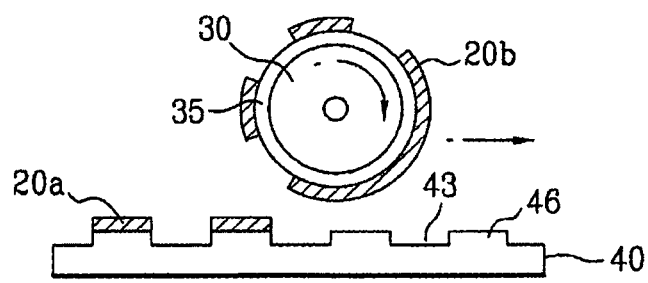
Figure 1C:
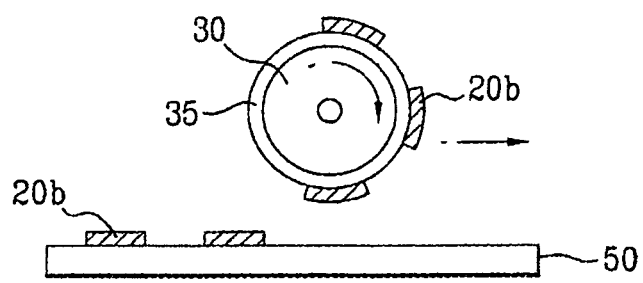
Figure 2A:
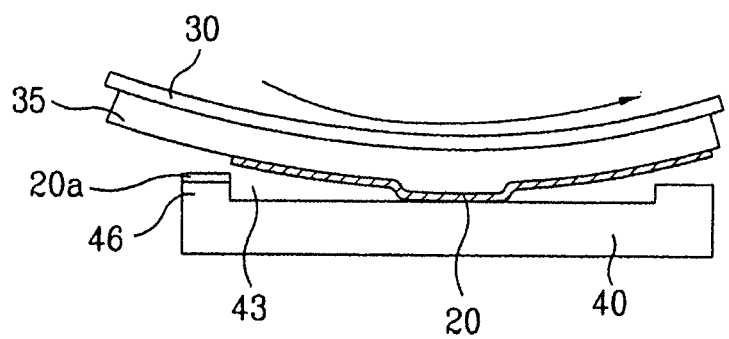
FIGS. 2A and 2B are cross section views illustrating problems of related art printing method.
Figure 2B:
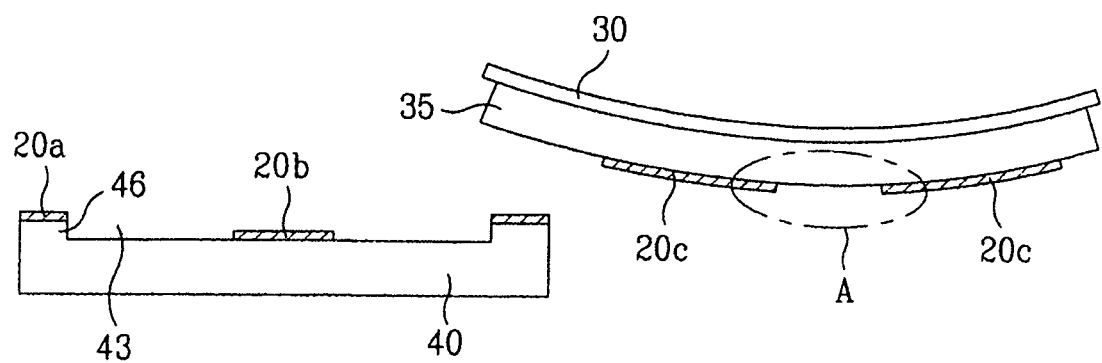
Figure 4A:
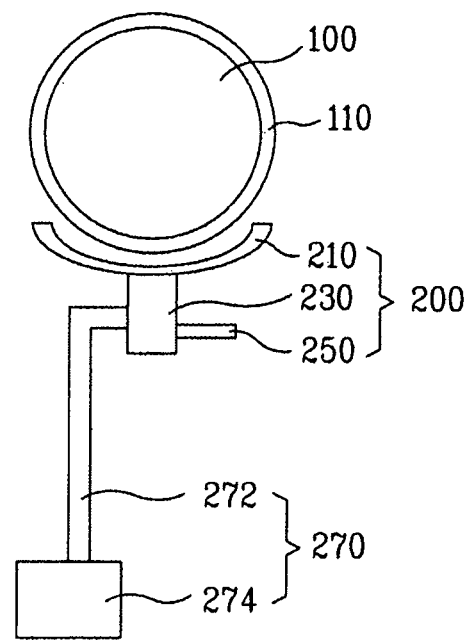
FIGS. 4A to 4C are views illustrating an absorption nozzle of a printing device according to an embodiment of the present invention.
Figure 4B:
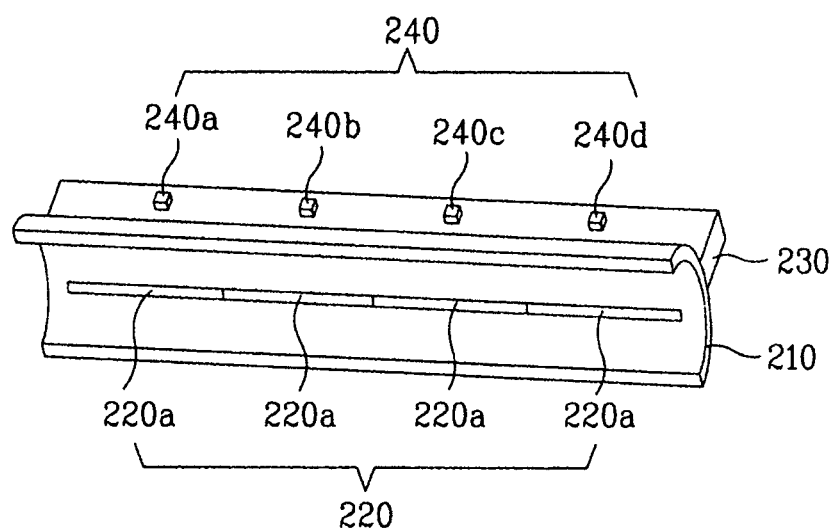
Figure 4C:
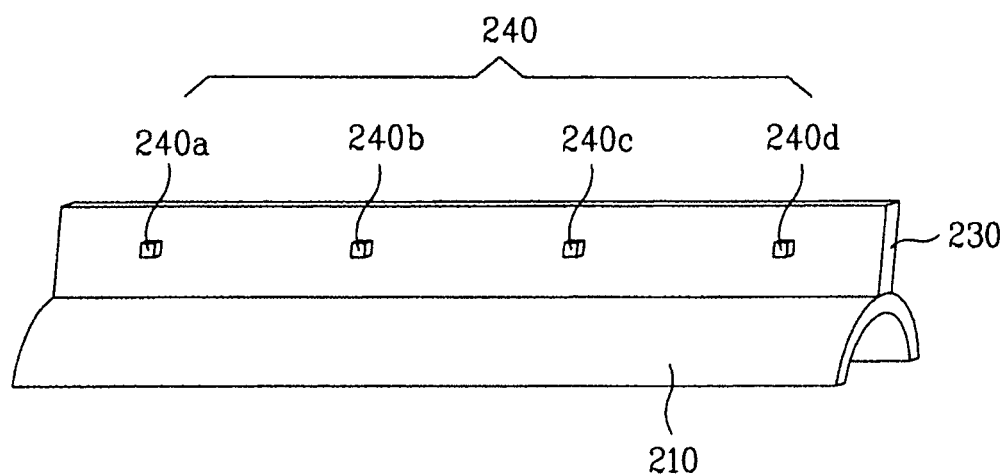

FIG. 3 schematically illustrates a printing device according to an embodiment of the present invention. FIGS. 4A to 4C are views illustrating an absorption nozzle according to an embodiment of the present invention.

As shown in FIG. 3, a printing device according to an embodiment of the present invention includes a rail 101, a printing roll 100, an absorption nozzle 200, a printing nozzle 400, a printing plate 500, and a substrate 600.

A blanket 110 is adhered to an outer surface of the printing roll 100. The printing roll 100 is moved along the rail 101 to the printing nozzle 400, the absorption nozzle 200, the printing plate 500, and the substrate 600 to form a predetermined pattern on the substrate 600.

The printing nozzle 400 applies a pattern material to the printing roll 100. The printing plate 500 is includes a plurality of protrusions 510. As the printing roll 100 is rolled on the printing plate 500, some of the pattern material is transferred or transcribed onto the protrusions 510 of printing plate 500, leaving a desired pattern on the printing roll 100 formed of the pattern material remaining of the printing roll 100. A cleaning device 700 is used to remove some or all of the pattern material transferred to the protrusions 510 of printing plate 500 after rolling the printing roll 100 on the printing plate 500.

The absorption nozzle 200 absorbs a solvent from the blanket 110 of printing roll 100. The absorption nozzle 200 will be explained in detail with reference to FIGS. 4A and 4C.

As shown in FIG. 4A, the absorption nozzle 200 includes an absorber 210, a vacuum controller 230 connected to the absorber 210, and a pipe 250 connected to the vacuum controller 230. The absorber 210 absorbs the solvent from the blanket 110 of printing roll 100 by application of a vacuum. The curvature of absorber 210 may be identical to or substantially the same as the curvature of printing roll 100. In this case, the entire area of the absorber 210 is maintained at a constant interval from the printing roll 100. Accordingly, it is possible to increase the area of absorber 210 applied to the surface of the printing roll, and to reinforce the absorption efficiency owing to the increased flow of vacuum pressure. The vacuum controller 230 controls the vacuum pressure applied to the absorber 210. The pipe 250 connects a source of vacuum to the absorber 210 for applying the vacuum pressure. A vacuum device may be provided at one end of the pipe 250 to supply the vacuum pressure.

In order to move the absorption nozzle 200 up and down or to move the absorption nozzle 200 towards or away from the absorption nozzle 200, a moving device 270 is connected to the absorption nozzle 200. The moving device 270 includes an absorption nozzle mover 272 connected to the absorption nozzle 200 and a driver 274 to drive the absorption nozzle mover 272. For example, the driver 274 may include a servomotor or a hydraulic cylinder.

Referring to FIGS. 4B and 4C, a slit 220 is formed in the absorber 210, and a regulator 240 is formed in the vacuum controller 230, whereby the regulator 240 controls the vacuum pressure applied to the slit 220. Accordingly, as the vacuum pressure controlled by the regulator 240 is applied through the slit 220, the absorption nozzle 200 absorbs solvent from the blanket 110 of printing roll 100. The slit 220 may include a plurality of sub-slits 220a, 220b, 220c and 220d, and the regulator 240 may include a plurality of sub-regulators 240a, 240b, 240c and 240d to respectively regulate the vacuum pressure applied to each of the sub-slits 220a, 220b, 220c and 220d.

When applying the vacuum pressure through the sub-slits 220a and 220d, the vacuum pressure at the side positioned sub-slits near the ends of the slit 220 (e.g. sub-lists 220a and 220d) may be more strongly influenced by the permeation of air external to the absorber than the vacuum pressure at centrally-positioned sub-slits (e.g. as 220a and 220d). Accordingly, the applied vacuum pressure (measures as the amount of pressure below atmospheric pressure) may be higher at the side-positioned sub-slits than at the centrally-positioned sub-slits, to thereby uniformly maintain the absorption intensity of vacuum pressure.

FIG. 5 schematically illustrates a printing device according to another embodiment of the present invention.

As shown in FIG. 5, the printing device according to another embodiment of the present invention includes a rail 101, a printing roll 100, an absorption nozzle 200, an air knife 300, a printing nozzle 400, a printing plate 500 and a substrate 600.

The printing device of FIG. 5 differs from the printing device illustrated in FIG. 3 primarily in that the printing device of FIG. 5 includes the air knife 300. Components in the printing device of FIG. 5 identical in structure to those of the printing device of FIG. 3 have identical reference numbers, and a detailed explanation of those components will be omitted.

After the absorption nozzle 200 absorbs solvent from the blanket 110 of printing roll 100, the air knife 300 supplies air to the blanket 110. As a result, the solvent remaining in the blanket 110 of printing roll 100 is evaporated so that the swelling of the blanket 110 of printing roll 100 due to solvent is eliminated or reduced.

In the embodiment illustrated in FIG. 5 only a single air knife 300 is shown. However, the printing device may include two or more air knives.

Hereinafter, a patterning method according to the present invention will be described as follows with reference to FIGS. 6A to 6D.

Figure 6A:
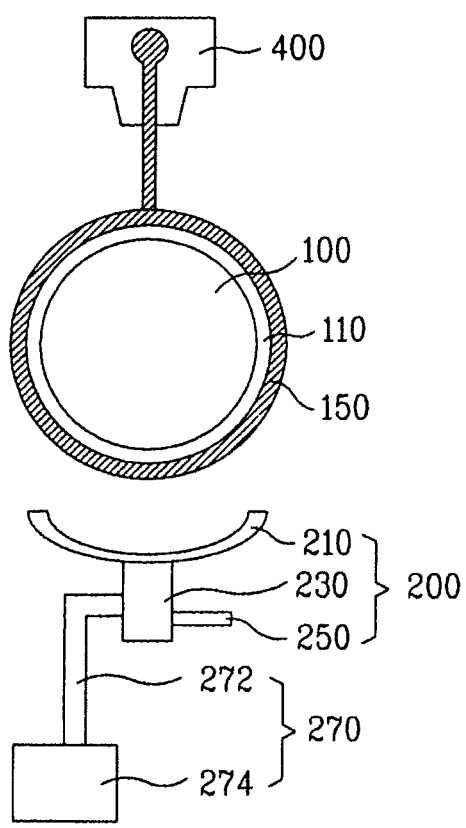
FIGS. 6A to 6D are cross section views schematically illustrating a patterning method according to an embodiment of the present invention.

First, as shown in FIG. 6A, the pattern material 150 is applied to the blanket 110 of printing roll 100 through the printing nozzle 400. In other words, the blanket 110 of printing roll 100 is coated with the pattern material 150.

Figure 6B:
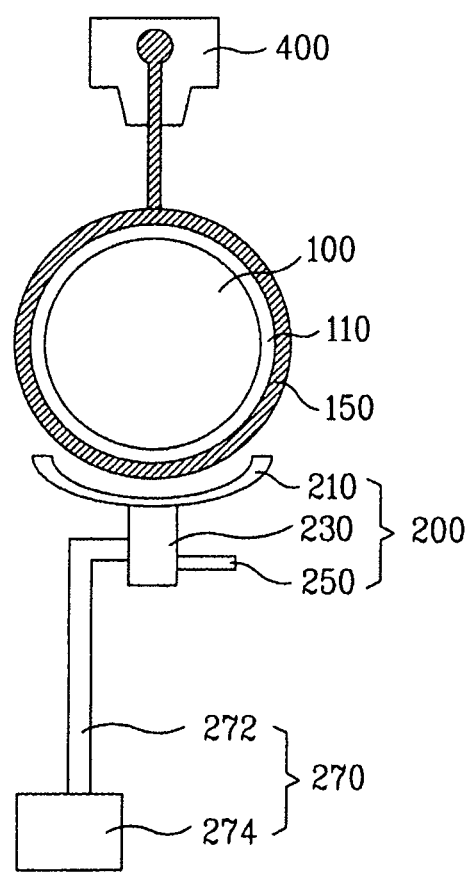

Next, as shown in FIG. 6B, solvent absorbed in the blanket 110 of printing roll 100 is absorbed from the blanket 110. The process of absorbing solvent from the blanket 110 may be performed using the absorption nozzle 200. The absorbing nozzle is moved toward the printing roll 100 by the moving device 270 that includes an absorption nozzle mover 272 and a driver 274.

The absorption nozzle 200 includes the absorber having a slit, the vacuum controller connected to the absorber, and the pipe connected to the vacuum controller as described above with reference to FIGS. 4A to 4C. Accordingly, the detailed explanation for the absorption nozzle and the operation thereof will not be repeated.

In the process of absorbing the solvent from the blanket 110 by the absorption nozzle 200, a plurality of regulators may be controlled such that the vacuum pressure applied to the side-positioned sub-slits is higher than the vacuum pressure applied to the centrally-positioned sub-slits. After completing the solvent absorption process, the moving device 270 moves the absorption nozzle 200 away from the printing roll 100, so that the absorption nozzle 200 is separated from the printing roll 100.

A process of evaporating solvent from the blanket 100 using at least one air knife 300 may be performed in addition to or in lieu of the process of absorbing solvent from the blanket 110 using the absorption nozzle 200.

Figure 6C:
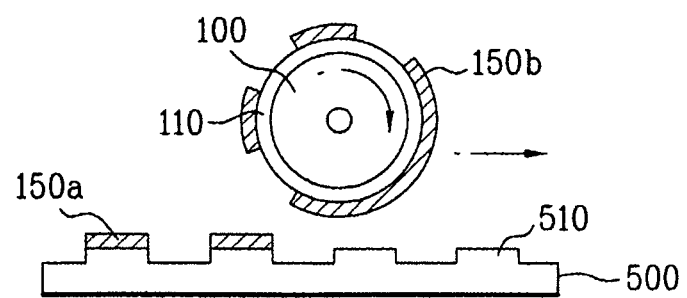

As shown in FIG. 6C, the printing roll 100 is rolled on the printing plate 500, and some of the pattern material 150a on the printing roll is transferred onto the protrusions 510 of printing plate 500. Thus, the predetermined pattern 150b is formed on the printing roll 100 by the remaining pattern material.

Figure 6D:
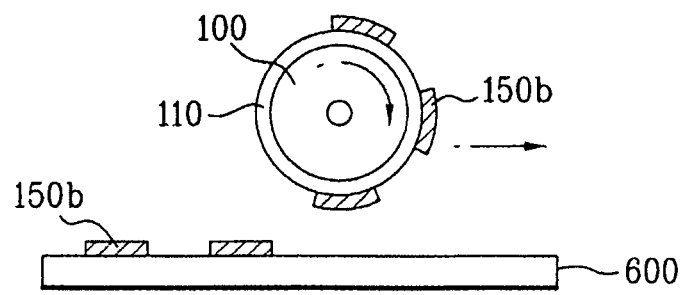

As shown in FIG. 6D, as the printing roll 100 is rolled on the substrate 600, the predetermined pattern 150b of printing roll 100 is transcribed or transferred onto the substrate 600. After completing the pattern transfer process, an additional process of cleaning the printing plate 500 may be carried out.

Hereinafter, a method of fabricating an LCD device according to the present invention will be explained as follows.

First and second substrates are prepared. The first substrate is prepared by forming a black matrix layer to prevent the light leakage, forming a color filter layer on the black matrix layer, and forming a common electrode on the color filter layer. The second substrate is prepared by forming a thin film transistor including: a gate electrode, a semiconductor layer, and source and drain electrodes on a transparent substrate, and forming a pixel electrode electrically connected to the drain electrode of thin film transistor.

When preparing the first substrate, the black matrix layer and the color filter layer may be formed using the patterning method described above with reference to FIGS. 6A-6D.

A liquid crystal layer is formed between the first and second substrates.

The process of forming the liquid crystal layer may be classified into a liquid crystal injection method and a liquid crystal dropping method.

When the liquid crystal injection method is used, a sealant having an inlet is formed on one of the first and second substrates, and then the first and second substrates are bonded to each other. Thereafter, liquid crystal is injected into a space between the first and second substrates through the inlet.

When the liquid crystal dropping method is used, a sealant having no inlet is formed on one of the first and second substrates, and then liquid crystal is dropped onto one of the first and second substrates. Thereafter, the first and second substrates are bonded to each other.

Accordingly, the printing device according to the present invention, the patterning method using the same, and the method of fabricating the LCD device using the printing device have the following advantages.

In the printing device according to the present invention, the absorption nozzle absorbs solvent from the blanket of printing roll. Thus, it is possible to prevent or reduce swelling of the blanket due to the solvent, thereby preventing forming a defective pattern and to reinforce the absorption efficiency owing to the increased flow of vacuum pressure. And the applied vacuum pressure may be higher at the side-positioned sub-slits than at the centrally-positioned sub-slits, to thereby uniformly maintain the absorption intensity of vacuum pressure.

In addition to the process of absorbing solvent from the blanket of printing roll using the absorption nozzle, an additional process of evaporating solvent from the blanket using an air knife may be performed, to enhance the removal of solvent from the blanket to prevent or reduce swelling of the blanket due to solvent.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an LCD device comprising:
   preparing first and second substrates; and
   forming a liquid crystal layer between the first and second substrates,
   wherein preparing the first substrate includes forming a pattern on the first substrate using a patterning method comprising:
      coating a blanket adhered to an outer surface of a printing roll with a pattern material;
      absorbing a solvent from the blanket of the printing roll using an absorption nozzle, wherein the absorption nozzle includes a vacuum controller connected to an absorber and a pipe, wherein the absorber includes a slit including a plurality of sub-slits, the vacuum controller includes a regulator including a plurality of sub-regulators, and the absorption nozzle is formed between the printing roll and a rail;

respectively regulating vacuum pressure applied to a respective sub-slit of the plurality of sub-slits on the absorber with a respective sub-regulator of the plurality of sub-regulators included on the vacuum controller such that the vacuum pressure applied to side-positioned sub-slits of the plurality of sub-slits is higher than the vacuum pressure applied to centrally-positioned sub-slits of the plurality of sub-slits; and applying the vacuum pressure respectively controlled by the sub-regulator to the blanket of the printing roll through the respective sub-slit;

evaporating the solvent from the blanket by supplying air to the blanket of the printing roll;

rolling the printing roll on a printing plate to form a predetermined pattern on the printing roll; and rolling the printing roll on the first substrate to transfer the predetermined pattern onto the first substrate.

2. The method of claim 1, wherein the predetermined pattern corresponds to a color filter layer.

3. The method of claim 1, wherein the predetermined pattern corresponds to a black matrix layer.

4. The method of claim 1, wherein forming the liquid crystal layer includes: forming a sealant having an inlet in any one of the first and second substrates; bonding the first and second substrates to each other; and injecting liquid crystal into a space separating the first and second substrates through the inlet.

5. The method of claim 1, wherein forming the liquid crystal layer includes: forming a sealant having no inlet in any one of the first and second substrates; dropping liquid crystal onto any one of the first and second substrates; and bonding the first and second substrates to each other.

6. The method of claim 1, wherein coating the blanket adhered to the outer surface of the printing roll with the pattern material is performed using a printing nozzle.

7. The method of claim 1, wherein a curvature of the absorber is substantially identical to a curvature of the printing roll.

8. The method of claim 1, further comprising moving the absorption nozzle towards the printing roll and away from the printing roll.

9. The method of claim 8, wherein moving the absorption nozzle is performed using a moving device that includes an absorption nozzle mover connected to the absorption nozzle and a driver to drive the absorption nozzle mover.

10. The method of claim 1, wherein evaporating solvent from the blanket is performed using at least one air knife.

11. The method of claim 1, further comprising cleaning the printing plate after rolling the printing roll on the first substrate to transfer the predetermined pattern onto the first substrate.

* * * * *